F. B. SCHREIBER.
AIR COOLING SHIELD FOR MOTOR CYCLES.
APPLICATION FILED JAN. 14, 1920.

1,412,634.

Patented Apr. 11, 1922.

Inventor
Francis B. Schreiber
by Jabel & Mueller
Atty

UNITED STATES PATENT OFFICE.

FRANCIS B. SCHREIBER, OF HARVEY, ILLINOIS.

AIR-COOLING SHIELD FOR MOTOR CYCLES.

1,412,634.	Specification of Letters Patent.	Patented Apr. 11, 1922.

Application filed January 14, 1920. Serial No. 351,514.

*To all whom it may concern:*

Be it known that I, FRANCIS B. SCHREIBER, a citizen of the United States, residing at Harvey, in the county of Cook and State of Illinois, have invented a certain new and useful Improvement in Air-Cooling Shields for Motor Cycles, of which the following is a full, clear, concise, and exact description, reference being had to the accompanying drawings, forming a part of this specification.

My invention relates to motorcycles and more particularly to air cooling shields for motorcycles.

It is an object of the invention to provide air cooling shields for a motorcycle having two or more cylinders. It is well known that the cylinders of motorcycles are air cooled and that when a plurality of cylinders are used, the cylinders are arranged in a row extending from front to rear on the motorcycle. When the motorcycle is running and is being driven forwardly, currents of air strike the foremost cylinder. The first cylinder however acts as a shield or guard for the cylinders behind it and directs the air away from the rear cylinders. For this reason the rear cylinders become over-heated in many instances. It is, therefore, a further object of my invention to provide air cooling shields which will direct currents of cold air onto the cylinders which are positioned to the rear of the first cylinder.

It is a further object of my invention to provide air cooling shields of the character set forth which are light in construction, neat in appearance and which may be readily applied to any motorcycle. Of course, it will be apparent that the design of the shields will have to be changed slightly in order to adapt the shields for use on different styles of motorcycles. This slight change in design will be necessary in order that the shields may be securely attached to portions of the motorcycles adjacent the cylinders. The general construction and operation of the shields, however, remains the same for all styles of motorcycles.

With these and other objects in view which will be apparent from the detailed description of the device disclosed in the drawings I have shown one form which my invention may take which form is the best known to me at the present time. However it is to be understood that by this specification and the accompanying drawings I do not intend to limit myself to the specific construction disclosed in the drawings. The real nature and scope of the invention disclosed is to be determined from the claims appended to this specification.

The same reference characters have been used to designate the same parts throughout the several views of the drawings in which Fig. 1 is a side view of the motorcycle having my improved air cooling shields attached thereto.

Figure 1:
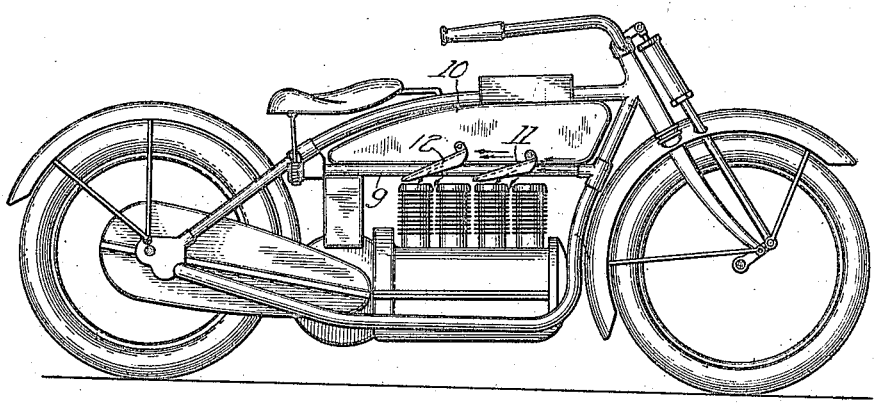

In the drawings I have shown my improved cooling shields attached to an ordinary four cylinder Henderson motorcycle. From the drawings it will be noted that the cylinders 5, 6, 7 and 8 are arranged in a line extending from front to rear. This is necessary in order to decrease the width of the motorcycle and to maintain the cylinders and engine centrally on the frame. The motorcycle is provided with the longitudinally extending frame member 9 above which is positioned the usual gasoline or fuel tank. Inasmuch as these are the only portions of the motorcycle which affect my invention further detailed description of the motorcycle will not be given here.

Figure 3:
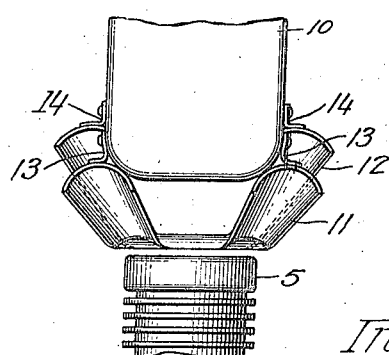
Fig. 3 is a front view of a portion of the cylinders, the shields and the supporting means for the shields.

When the motorcycle is driven forwardly air currents will pass from the front to the rear of the motorcycle. These air currents will strike cylinder 5 and will be deflected outwardly thereby so that only small amounts of air currents will reach cylinders 6, 7 and 8. This results in overheating of these cylinders and my shields are intended to direct currents of air downwardly onto the cylinders 6, 7 and 8. In the drawings I have shown two shields 11 and 12 which are positioned above the cylinders as shown in Fig. 1 and are attached to the fuel tank 10 by means of brackets 13 and 14 as clearly shown in Fig. 3 of the drawings. The shield 11 is positioned forwardly of the shield 12 and the forward edge of the shield 11 is positioned at a lower level than the forward edge of the shield 12. This will be clear from the front view of the device shown in Fig. 3. Each shield extends rearwardly from its point of attachment to the motorcycle and is also inclined downwardly as shown. It is also preferred to curve the shields as shown in Fig. 3 in order that they will more efficiently direct currents of air onto the cylinders.

Figure 2:
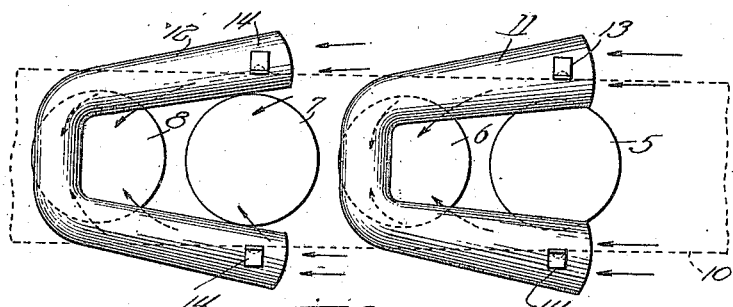
Fig. 2 is a plan view of the cylinders and shields and showing the relative position of the shields to the cylinders. In this view the supporting means for the shields is shown in dotted outline.

With shields constructed as described above the operation will be apparent. When the motorcycle is driven forwardly any air passing over the top of cylinder 5 will strike shield 11 and will be directed downwardly thereby onto cylinder 6 and also between cylinders 6 and 7. Inasmuch as the forward edge of shield 12 extends above the shield 11 air passing over the shield 11 will be directed downwardly by shield 12 onto cylinders 7 and 8 and between cylinders 7 and 8. The direction of air currents is indicated by the arrows shown in Figs. 1 and 2. When the air is thus directed onto the cylinders an even cooling of the cylinders takes place. The motorcycle will therefore operate more efficiently and there will be no danger of burning out certain of the cylinders.

While I have shown my improved cooling shields attached to a motorcycle it will be apparent that they may be attached to any air cooled engine which moves in any direction which will cause air currents to flow past the engine or may be used on any stationary engine which may have cool air currents directed thereagainst. The shields are equally as applicable to any automobile engine or to an aeroplane engine. The disclosure herein is merely illustrative of the general construction and operation of my device.

From what has been described above the construction and operation of my invention will be apparent. What I claim as new and desire to secure by United States Letters Patent is:

1. An air cooling device for motorcycles having a plurality of cylinders arranged in a row extending from front to rear, which comprises a plurality of downwardly inclined shields arranged above the cylinders, and means for attaching said shields to the motor cycle, said shields each comprising a transversely extending portion and inclined portions transversely curved in cross section, said shields being so positioned that the upper edge of the foremost shield is at a lower level than the upper edge of any shield to the rear.

2. An air cooling shield for motorcycles comprising a substantially U-shaped member having a pair of legs and a connecting bight portion and having curved air engaging surfaces which are inclined downwardly when the shield is attached to a motorcycle.

3. An air cooling shield for motorcycles which comprises a substantially U-shaped member having downwardly inclined air engaging surfaces which are so curved that they direct the air downwardly toward the cylinder of the motorcycle and inwardly toward the sides of the cylinder.

4. An air cooling device for motorcycles having a fuel tank and a plurality of cylinders positioned in a row beneath the fuel tank which comprises shields supported by said fuel tank, curved air engaging surfaces forming portions of said shields having transverse portions and inclined portions, said surfaces having their concave sides facing said cylinder so as to form rearwardly and downwardly extending air passages and deflectors, the shields being so positioned that their rear edges are substantially at the same level and the upper edge of the foremost shield is at a lower level than that of the rearmost shield.

In witness whereof, I hereunto subscribe my name this 30th day of December, A. D. 1919.

FRANCIS B. SCHREIBER.